(12) United States Patent
Brunner et al.

(10) Patent No.: US 8,158,924 B2
(45) Date of Patent: Apr. 17, 2012

(54) OPTICAL ENCODER ASSEMBLY WITH A FLEXIBLE BEAM

(75) Inventors: Bjoern Erik Brunner, Beaverton, OR (US); David D. Martenson, Oregon City, OR (US)

(73) Assignee: Xerox Corporation, Norwalk, CT (US)

( * ) Notice: Subject to any disclaimer, the term of this patent is extended or adjusted under 35 U.S.C. 154(b) by 668 days.

(21) Appl. No.: 12/248,538

(22) Filed: Oct. 9, 2008

(65) Prior Publication Data
US 2010/0091303 A1    Apr. 15, 2010

(51) Int. Cl.
  *G01D 5/34*   (2006.01)
(52) U.S. Cl. ........................ 250/231.13; 356/617; 341/14
(58) Field of Classification Search ........... 250/231.13–231.18; 341/13, 14; 356/614, 615, 617; 359/436
See application file for complete search history.

(56) References Cited

U.S. PATENT DOCUMENTS

| 6,646,571 | B1 * | 11/2003 | Soar et al. ........................ 341/13 |
| 2005/0253094 | A1 * | 11/2005 | Yeoh et al. .................. 250/559.3 |
| 2006/0250292 | A1 * | 11/2006 | Yamagata ..................... 341/192 |

* cited by examiner

*Primary Examiner* — Francis M Legasse, Jr.
(74) *Attorney, Agent, or Firm* — Marger Johnson & McCollom PC

(57) ABSTRACT

An optical encoder assembly has an encoder sensor, a code strip, and a base having a first portion and a second portion, wherein the encoder sensor is mounted on one of either the first portion or the second portion and the code strip is mounted on the other portion. An optical encoder assembly has a base having an upper base and a lower base, the upper base joined to the lower base with at least one flexible beam, an encoder sensor mounted to one of the upper base or the lower base, and a code strip mounted to the other of the upper base or the lower base. A method includes mounting an encoder sensor to a first mating surface on the first side of a base, mounting a code strip to a second mating surface on the second side of the base with the first and second sides of the base connected by at least one flexible beam, and attaching the base to an object to be measured such that deflections between the first and second mating surfaces can be measured using the encoder sensor.

23 Claims, 5 Drawing Sheets

OPTICAL ENCODER ASSEMBLY WITH A FLEXIBLE BEAM

BACKGROUND

Optical position encoders are used to accurately measure mechanical displacements between components of any apparatus undergoing movement, vibration, etc. The optical position encoder typically includes a movable code strip, with an optical track comprised of alternating transparent and opaque bars, that passes through and moves relative to an encoder sensor comprised of an illumination source, typically a light emitting diode (LED) and sensor array composed of a plurality of photosensitive elements usually photodiodes.

As the code strip moves, it interrupts the light from the illumination source causing an alternating series of light and shadow to pass across the sensor array producing electric signals that vary in amplitude. Circuitry in the encoder sensor amplifies the signals to produce two output signals in quadrature, phase-A and phase-B which is phase shifted from phase-A by 90 electrical degrees. As the code strip moves, this quadrature signal varies in frequency proportional to the speed of motion, and the phase relationship between phase-A and phase-B indicates the direction of motion.

Detection of the relative motion of components allows systems to provide adaptations and adjustments based upon the displacements. In some applications mechanisms that move through small displacements use an array of strain gauges bonded to flexible movable components. When correctly calibrated the detected variations in strain as those components flex provides an indirect measure of the motion. Strain gauges tend to be small and delicate components that need to be carefully and accurately applied to the surface being measured, attached using adhesive, protected with an additional coating, and cannot be easily replaced if damaged. Using an optical position encoder allows direct measurement of these small displacements and eliminates the complex assembly procedures involved when using strain gauge arrays. However, like the strain gauges, the components of an optical encoder also need to be accurately aligned to operate properly.

Typically, the mounting for the encoder involves mounting the encoder sensor on one base to one component or portion of an apparatus. The code strip generally has a separate mounting or base and needs to be accurately positioned relative to the encoder sensor. This results in two separate assemblies with two separate fastener systems. For field replacement, a service technician would have to carry two separate units and diagnose and replace them independently. The resulting complexity of both manufacture and service is undesirable.

DETAILED DESCRIPTION OF THE EMBODIMENTS

Figure 1:
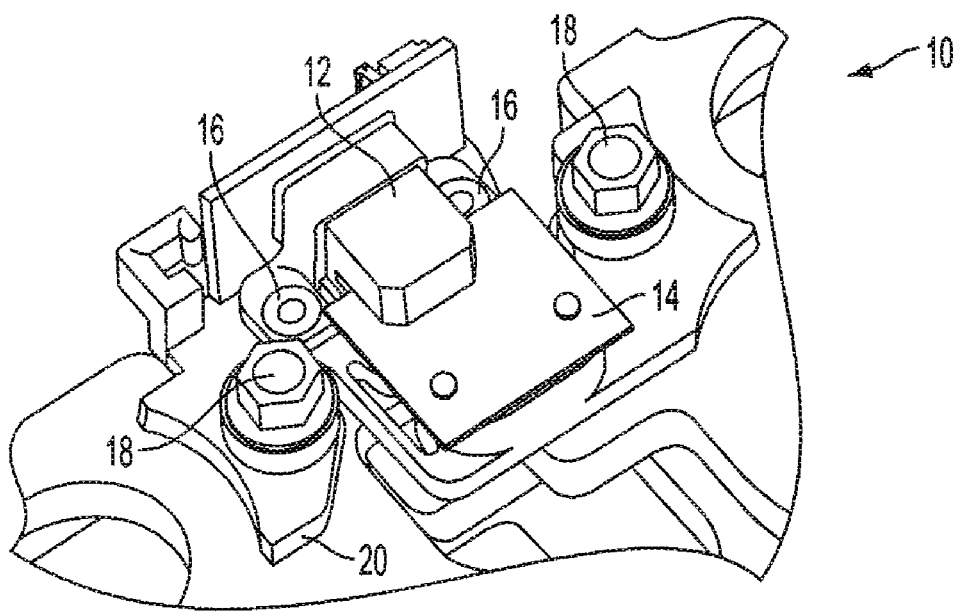
FIG. 1 shows an embodiment of a flexure mounted optical displacement encoder.

FIG. 1 shows an embodiment of a flexure mounted optical displacement encoder 10. Optical displacement encoders generally consist of an illumination device and a light detector and may take the form of an encoder sensor and a code strip, each mounted to separate bases but because the relative displacements being measured by this encoder assembly are small it is possible to mount the code strip and sensor on a single base. In the embodiment shown in FIG. 1, the displacement encoder 10 has a single base 20 upon which is mounted the encoder sensor 12 and the code strip 14. An optical displacement encoder will be defined here as incorporating a light source and a light detector interacting with a code strip that admits, blocks or alters the light source incident on the detector where the code strip has any number but at least two such light altering features separated by a known distance.

As shown in FIG. 1, attachments 18 mount the base 20 to whatever object is being measured by the displacement encoder. In this example, the attachments consist of screws. These are merely one example of means of mounting the base to the object, many more are possible, including screws, rivets, plastic snap fits, or metal crimps. Similarly, the figure shows that rivets 16 mount the encoder sensor to the base 20. Other alternatives are possible including such examples as screws, eyelets, adhesive, ultrasonic or heat stakes, or permanent or reusable rivets. The code strip may also mount to the base with any of the above approaches, with the embodiment shown in FIG. 1 using a pressure sensitive adhesive or other bonding material.

The base 20 may consist of several different materials. One should consider the amount of force required to deflect the flexure beams 26 that separate the part of the base on which the encoder sensor is mounted from the part of the base on which the code strip is mounted as well as the intended displacement range. If the base consists of a flexible enough material and the beam elements are sufficiently thin and long, the amount of force required to deflect these beams will generally be small enough to be insignificant compared to the forces acting on the parts. As an illustrative example, in one finite element analysis using plastic material the amount of force needed to deflect the beams was approximately 9 Newtons. Other such materials may include polyimide, polypropylene, thin flexible metal such as spring steel, etc.

Figure 2:
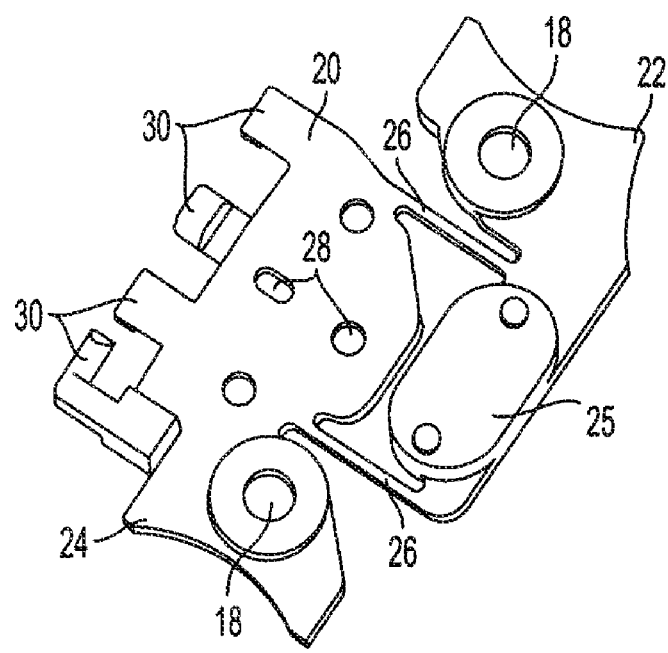
FIG. 2 shows an embodiment of a flexure mount for an optical displacement encoder.

FIG. 2 shows a more detailed view of an embodiment of a base having flexure beams. In this embodiment the base 20 consists of a first portion, referred to here as the 'upper' base 22 and a second portion, referred to here as the 'lower' base 24. The two portions are connected by flexible or flexure beams 26 that allow the two parts of an optical encoder to move independently, allowing a measurement to be taken.

In the specific embodiment of FIG. 2, the upper base 22 would support the code strip and the lower base 24 would support the encoder sensor. However, this is merely one embodiment and the arrangement could be reversed as desired. In the embodiment of FIG. 2, the upper base 22 has a mounting 25 to which the code strip 14 from FIG. 1 would attach.

Similarly, the lower base 24 may have locating features such as 28 that receive locating pins on the encoder sensor body 12 and allow the encoder sensor to be positively located prior to attachment with, for example, rivets 16 as shown in FIG. 1.

As can be seen in FIG. 2, the base attachments 18 are arranged such that one attachment resides on the upper base 22 and another attachment resides on the lower base 24. This arrangement may be adapted as necessary, including adding more attachments or moving the position of the attachments, depending in large part on the configuration of the object being measured. Other features such as 30 may provide for wire guidance and strain relief.

The unified base scheme can be adapted to measure motion in multiple directions or small rotational motion. One may adapt the shape of the base and its portions and the beams to measure in other dimensions rather than just displacement in one direction. An encoder code-strip pair would be needed for each axis of motion being measured. FIGS. 3-6 show several different base and beam configurations, these are shown as illustrative examples and no limitation to any particular configuration is intended, nor should it be implied.

The various embodiments of the base allow for small linear displacements along various axes between the sensor and the code strip. A second pair of beams may be added to allow for motion in a second axis between the encoder elements. A cruciform arrangement of the beams would allow for measurement of small angular deflections between the sensor and a code strip with radially arranged bars. In an alternative embodiment, the code strip may by a portion of a code wheel, depending upon the nature and magnitude of the angular displacement.

The base shape is application dependent and may take many forms. For example, the beam could accommodate displacement along a third axis by a beam design having the appropriate three dimensional configuration. Other considerations with regard to a given configuration include improving the stress uniformity by thinning the central portions of the beams and adding fillet radii to the ends of the beams where they attach to the first and second portions of the base.

Figure 3:
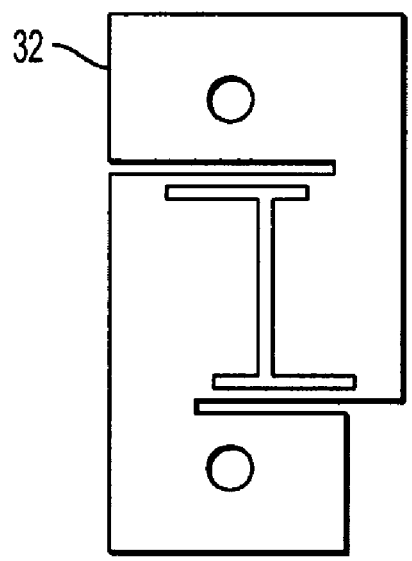
FIG. 3 shows a simplified representation of embodiment of the flexure mount.

In FIG. 3, the base 32 would attach at the upper and lower portions using attachments similar to base 20. This configuration measures displacement along the Y-axis, or vertically with respect to the figure.

Figure 4:
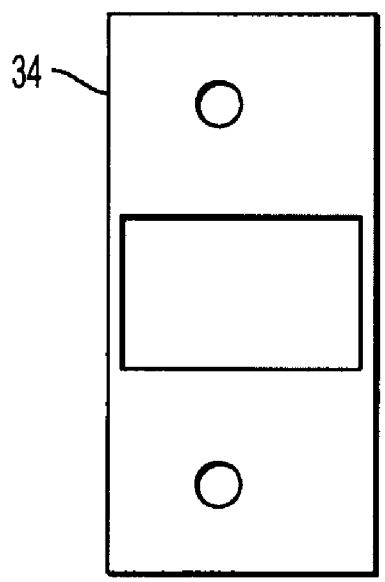
FIG. 4 shows a simplified representation of an alternative embodiment of a flexure mount.

FIG. 4 shows a rectangular base 34 that attaches the two portions of the base as shown by attachments similar to base 20. This configuration measures displacement along the X-axis, or horizontally with respect to the figure.

Figure 5:
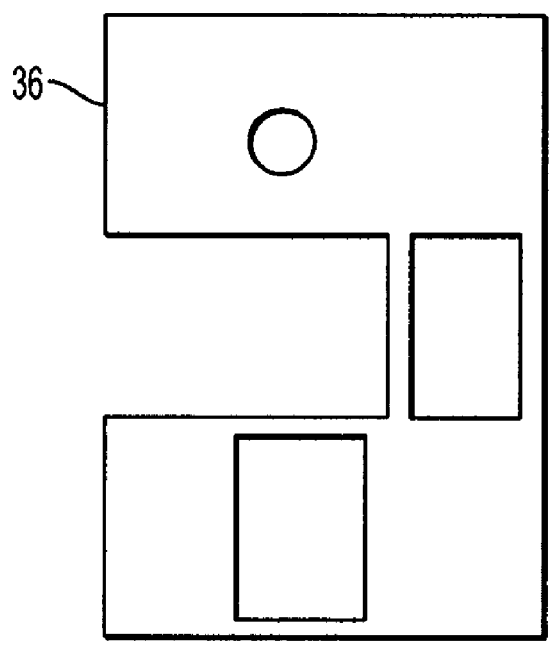
FIG. 5 shows a simplified representation of an alternative embodiment of a flexure mount.

FIG. 5 shows an offset base 36 that attaches such that one pair of flexure beams resides to one side of the base, rather than being a like distance from a center point. This configuration enables measurements of displacement along both the X-axis and the Y-axis.

Figure 6:
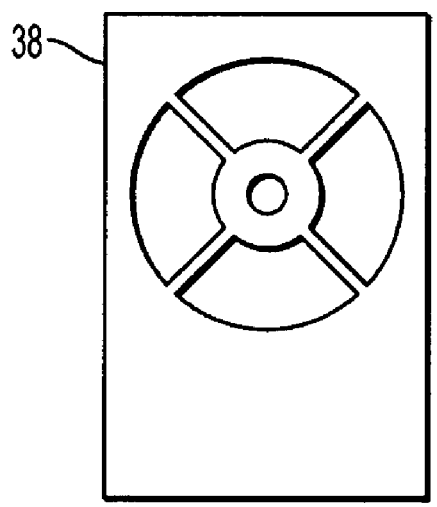
FIG. 6 shows a simplified representation of an alternative embodiment of a flexure mount.

FIG. 6 shows a simplistic rotary base 38 configuration. In FIG. 6, the upper or first portion of the base would be the center, circular portion, and the lower or second portion of the base would be the larger rectangular piece. This configuration could be employed to measure angular displacement about the Z-axis, which could be thought of as coming out of the page.

Figure 7:
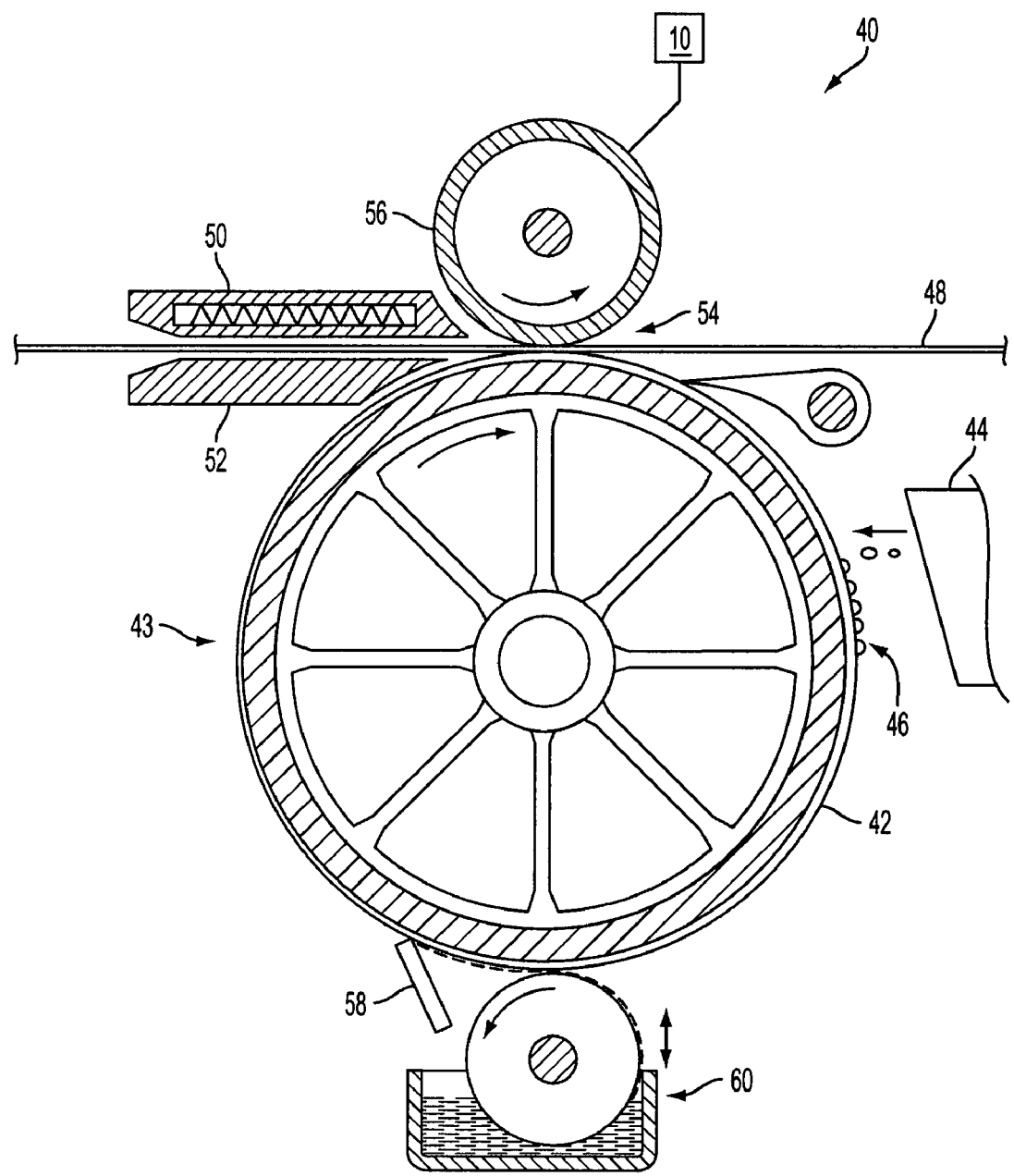
FIG. 7 shows a simplified representation of an embodiment of a printing system that uses a roller

As mentioned above, the encoder sensor and code strip may apply to any system for which displacement measurements would be desirable. Examples include printing systems. FIG. 7 shows one such printing system. The printing system 40 has a drum 43 upon which resides an intermediate transfer surface 42 on to which a printhead 44 dispenses ink 46. The intermediate transfer surface 42 may consist of a liquid applied by a metering blade 58 from a reservoir 60. A print medium 48 is guided and possibly heated by guide 52 and heater/guide 50 as it enters the nip 54 formed by the roller and drum.

A pressure roller 56 operates against the drum 43, forming a 'nip' 54. As the media passes through the nip ink is transferred and fixed to the media. Generally, this roller is referred to as a 'transfix' (transfer and fix) roller. In some cases, being able to adjust the pressure applied at the nip based upon properties of the print substrate has several advantages. These advantages include the ability to eliminate fluctuations in roller load that may cause variations in printed images, reduce the roller load when a higher load it not required, as well as to compensate for the variation in components that comprise the transfix roller load assembly 70. This provides consistent image quality, longer component life, and more reliable media handling.

Attachment of an optical displacement encoder 10 to the mechanism that generates the load applied to transfix roller 56 which allows for the adjustment of the roller load is disclosed in more detail in US Patent Publication Number 20070103531, which is incorporated by reference here in its entirety.

The encoder disclosed there is mounted such that the base for the encoder sensor and the base for the code strip are two separate components. During manufacture, this requires installation and alignment of two separate assemblies having two separate fastener systems. In addition, if the displacement encoder fails, a service technician would have to diagnose two separate assemblies and carry two separate replacement assemblies. Having an encoder assembly with a single unified base upon which both components of the optical encoder are mounted alleviates these problems.

Figure 8:
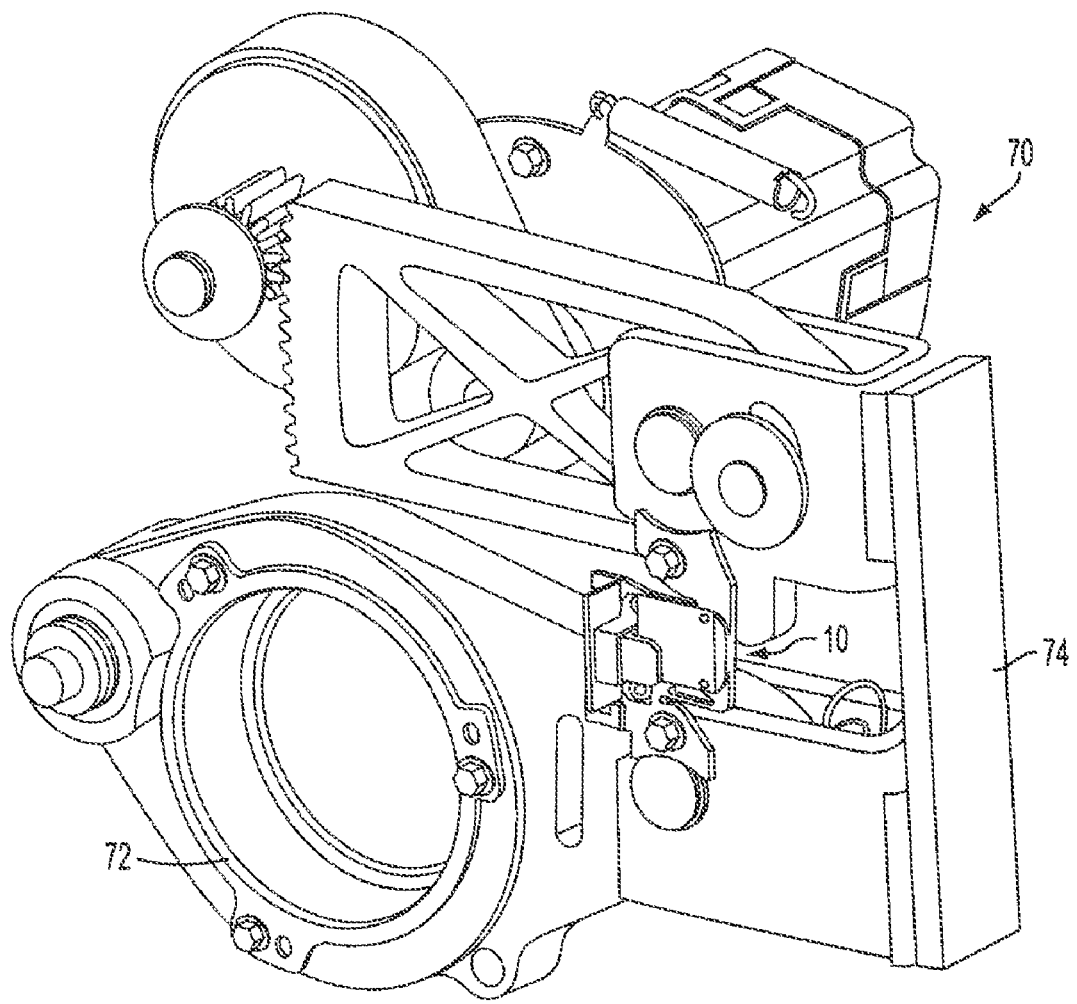
FIG. 8 shows an embodiment of part of a mechanism used to push a roller against an imaging medium.

FIG. 8 shows a detailed view of the transfix roller load assembly 70. The bearing on one end of the transfix roller 56 is held by the arm 72 which in turn connects to one end of the flexible link 74. As the apparatus operates the flexible link will move and flex between the upper and lower portions as load is applied. This flexing will cause relative motion between the ends of the flexible link 74 that the optical encoder 10 measures.

The example of a printing system that uses an optical encoder mounted on a single base is illustrative of one application and no limitation to such an application is intended nor should it be implied. Any system in which measurement of displacement between its parts is useful may use such an optical encoder.

In this manner, the system can have load control based upon displacement measurement of the two ends of the flexible link 74. An optical encoder mountable as a single assembly would provide the displacement measurement in a more-easily manufacturable and serviceable arrangement.

The above discussion describes an optical position encoder module that is easy to manufacture, is assembled on a base that provides accurate sensor and code strip alignment, allows relative motion of the sensor and code strip in only the measurement direction, and requires no special tools or critical alignment procedures. Since the encoder is a single module it is easy to install and remove from an apparatus, is attached to the moving parts of an apparatus with common fasteners, and requires no critical alignment procedures. The sensor side of the encoder module is attached to one component of the apparatus and the code strip side is attached to the other component. The unique construction of the base allows the two components of the apparatus to move freely relative to one another. One embodiment uses a transmissive optical encoder but the described method can be used with other encoder technologies such as reflective optical, inductive, capacitive, etc.

It will be appreciated that several of the above-disclosed and other features and functions, or alternatives thereof, may be desirably combined into many other different systems or applications. Also various presently unforeseen or unanticipated alternatives, modifications, variations, or improvements therein may be subsequently made by those skilled in the art which are also intended to be encompassed by the following claims.

What is claimed is:

1. An optical encoder assembly, comprising:
   a displacement encoder sensor;
   a code strip; and
   a single base having a first root portion and a second root portion, wherein the encoder sensor is mounted on one of either the first root portion or the second root portion, the first and second root portions connected by a flexible beam having a center that is thinner than the root portions and the code strip is mounted on the other portion such that the sensor detects displacement between the encoder sensor and the code strip.

2. The optical encoder assembly of claim 1, wherein the base comprises first and second attachments to allow attachment to an object to be measured, arranged such the first attachment is on the first portion and the second attachment is on the second portion.

3. The optical encoder assembly of claim 1, wherein the encoder sensor is mounted to the base using one of screws, eyelets, adhesive, ultrasonic stakes, heat stakes, permanent rivets, or reusable rivets.

4. The optical encoder assembly of claim 1, wherein the base comprises one of injection molded plastic, polyimide, polypropylene, metal or aluminum.

5. The optical encoder assembly of claim 1, wherein the base is configured to allow accurate positioning and orientation of the encoder sensor and code strip relative to each other.

6. The optical encoder assembly of claim 1, wherein the base has a configuration that is one of tabbed, hooked, rectangular, offset, or rotary.

7. The optical encoder assembly of claim 2, wherein the attachments are one of screws, plastic snap fits, or metal crimps.

8. The optical encoder assembly of claim 2, wherein the object to be measured is a component of a printing system.

9. An optical encoder assembly, comprising:
   a single base of base material formed into an upper base and a lower base, the upper base joined to the lower base with at least one flexible beam formed of the base material, the beam having a central portion and a plurality of roots wherein the central portion is thinner than the roots of the beam;
   a deflection encoder sensor mounted to one of the upper base or the lower base; and
   a code strip mounted to the other of the upper base or the lower base.

10. The optical encoder assembly of claim 9, wherein the encoder sensor is mounted to the lower base and the code strip is mounted on the upper base.

11. The optical encoder assembly of claim 9, wherein the encoder sensor is mounted to the lower base and the code strip is mounted on the upper base.

12. The optical encoder assembly of claim 9, wherein the base allows accurate positioning and orientation of the encoder sensor and code strip relative to one another.

13. The optical encoder assembly of claim 9, wherein the base is made of a single piece of material.

14. The optical encoder assembly of claim 9, wherein the base is configured as one of tabbed, hooked, rectangular, offset or rotary.

15. The optical encoder assembly of claim 9, wherein the at least one flexible beam comprises between one and six pairs of flexible beams.

16. The optical encoder base of claim 13, wherein the material is one of plastic or metal.

17. A method, comprising:
   mounting an encoder sensor to a first side of a base having first and second sides connected by at least one flexible beam formed from the base, the first side having a first mating surface and the beam having a central portion and a plurality of roots wherein the central portion is thinner than the roots of the beam;
   mounting a code strip to the second side of the base, the second side having a second mating surface; and
   attaching the base to an object to be measured such that deflections between the first and second mating surfaces can be measured using the encoder sensor.

18. The method of claim 17, wherein mounting the encoder sensor comprises mounting the encoder sensor with screws, eyelets, adhesive, ultrasonic stakes, heat stakes, permanent rivets, or reusable rivets.

19. The method of claim 17, wherein mounting the code strip comprises mounting the encoder sensor with screws, eyelets, adhesive, ultrasonic stakes, heat stakes, permanent rivets, or reusable rivets.

20. The method of claim 17, the method further comprising manufacturing the base.

21. The method of claim 20, wherein manufacturing the base comprises forming the base by injection molding.

22. The method of claim 20, wherein manufacturing the base comprises adding fillet radii to roots of the beams.

23. The method of claim 20, wherein manufacturing the base comprises reducing the width of the beams at their mid-span.

* * * * *